United States Patent [19]

Nitz

[11] 3,765,066

[45] Oct. 16, 1973

[54] HOSE CLAMP

[76] Inventor: Albert H. Nitz, 9132 W. Bluemound Rd., Milwaukee, Wis.

[22] Filed: Apr. 14, 1972

[21] Appl. No.: 244,173

[52] U.S. Cl. ............................ 24/279, 24/284
[51] Int. Cl. ............................ B65d 63/02
[58] Field of Search ............... 24/279, 280, 284; 285/352, 353, 365, 366

[56] References Cited
UNITED STATES PATENTS
2,482,374  9/1949  Ruschmeyer .................... 24/280

FOREIGN PATENTS OR APPLICATIONS
744,975  2/1944  Germany ........................ 24/279
20,723   0/1930  Netherlands .................... 24/279
122,148  1/1919  Great Britain ................... 24/279

Primary Examiner—Bernard A. Gelak
Assistant Examiner—Kenneth J. Dorner
Attorney—Willis B. Swartwout, III

[57] ABSTRACT

The present invention is an improved clamping device for use in connecting generally flexible automobile radiator hoses and the like to pipes in water tight engagement therewith by use of improved tension exerting fastening means maintaining drop tight connections despite softening of the hose material during prolonged use and including a 360° continuous pressure transferring sealing ridge.

4 Claims, 5 Drawing Figures

Patented Oct. 16, 1973  3,765,066
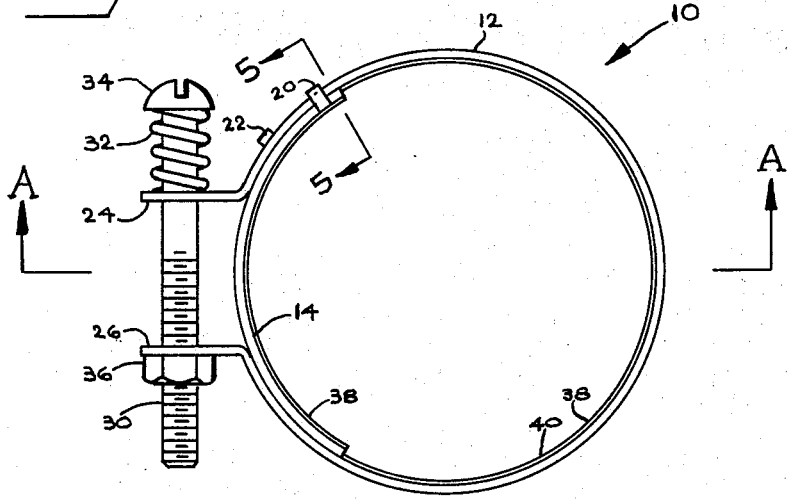
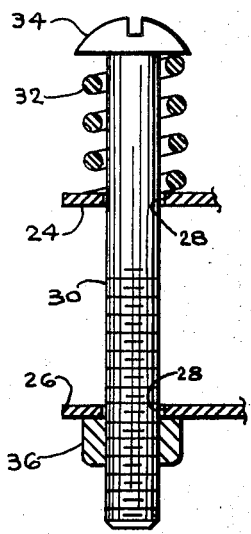
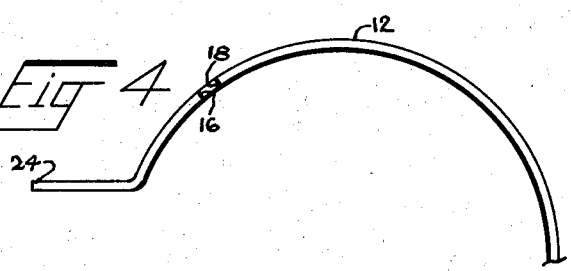
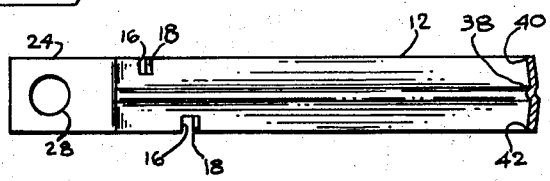
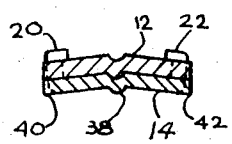

HOSE CLAMP

Many different types of hose clamping devices have been used in the past. The positive clamp device in its best known form has included a screw tightening structure which engages the clamp member in the manner of a worm gear to draw the band snugly about the hose and compress the hose against the pipe or tube sealing the connection therebetween. Such clamps perform satisfactorily for a time but as the hose ages, softens and deteriorates the clamp must be tightened to continue to function. Vibration and heat expansion of the metal clamp also tend to loosen the clamps engagement with the hose. A second type of clamp is made from heavy spring metal and placed around the hose by expanding the spring metal and letting it snap in place around the hose. Such a clamp is not adjustable and cannot be made smaller than its inherent limitations except by distorting it thereby ruining its clamping ability throughout a 360° circle.

The present invention proposes to overcome the problems of the prior art by providing a clamping device which includes a member forming an arc in excess of 270° but less than 360°. At either end of the arcuate members and integral therewith tabs extend from said member at angles relative to a tangent of the arc, intersecting the arc of the point thereon where the tab and arc join such that the tab and tangent form an obtuse angle. The tab angles with the tangents are such that the two tabs are spaced and generally parallel. Each tab is provided with an aperture and the apertures are axially aligned to receive an elongated bolt therethrough. A helical coil spring is placed between the bolt head and tab in its expanded state and a nut is fitted to the end of the bolt remote from the head after the bolt is passed through the tab apertures. The bolt head is slotted to receive the blade of a screwdriver or similar tool and the nut is hexagonal to receive a wrench if required. An arcuate clamp insert is attached to the arc on the curved surface thereof just prior to the tab area and extends across the gap in the arc below the spaced parallel tabs and is complementary in cross-sectional configuration to the configuration of the arcuate member to fit complementary against the inner surface of the member slidably. The cross-sectional configuration of the member and insert are such as to create a triple seal against the hose surface and pipe or flange to which it is telescopingly slidably fitted. The bolt is tightened to create the desired seal and until the spring is under substantial tension insuring that the seal will be retained even if hose softening or deterioration takes place and holds the bolt against loosening in the event of vibration.

It is an object of the present invention to provide a clamping device for hose-pipe connections or the like including an arcuate member having an arc in excess of 180° and provided with spaced parallel outwardly extending co-extensive tabs at either end of said arc an arcuate insert member coupled adjacent one arcuate extremity to said member and of sufficient extent in degrees to complete at least a 360° circle with the member and pressure exerting means coupled with the tabs for drawing the device snugly about a generally flexible hose in the area of said hose overlapping the telescopingly inserted pipe to seal the hose against the pipe.

It is an object of the present invention to provide a clamping device for hose-pipe connections having clamp tightening structure for tightening said clamp under tension to retain the seal formed thereby.

It is another object of the present invention to provide a device of the character described wherein the clamping device includes two arcuate clamp sections joined together to form at least a 360° arc or circle which is expandable or contractable.

It is a further object of the present invention to provide a device of the character described wherein the arcuate clamp sections are shaped in cross-sectional dimension to provide a triple sealing engagement against the hose-pipe connection.

Various other objects and advantages of the present invention as well as various modifications and changes which can be made to the structure of the present invention without departing from the spirit thereof will become apparent as this description proceeds and such additional objects, advangages, modifications and changes are intended to be covered by the scope of the appended claims.

In the drawings:

FIG. 1, is a horizontal plan view of structure including the present invention;

FIG. 2, is an enlarged horizontal plan view of the clamp tightening and tension exerting structure shown in FIG. 1;

FIG. 3, is a fragmentary vertical cross-sectional view taken along line A—A of FIG. 1;

FIG. 4, is a fragmentary vertical plan view taken along arc A—A of FIG. 1 with the clamp tightening and tension exerting structure of FIG. 2 removed; and FIG. 5, is a transverse cross-sectional view of the structure shown in FIG. 1 taken across the area of FIG. 1 designated.

Referring now to the drawings and particularly FIG. 1 thereof, a clamp structure is disclosed generally identified by the numeral 10. Structure 10 includes a first arc segment 12 and a second arc segment 14. Segments 12 and 14 when joined together form at least an arc of 360° or a full circle.

Arc segment 12 is provided with at least a pair of arcuately offset indentations defined by margins 16 and 18 perpendicular to said segment 12, on opposite sides thereof in the plane thereof. Arc segment 14 is provided with a pair of arcuately spaced generally rectangular tabs 20 and 22 perpendicular to segment 14 on opposite sides thereof in the plane thereof. Tabs 20 and 22 are spaced identically to margins 16 and 18 so that segments 12 and 14 may be placed with their radially inward and outward surfaces respectively flush at the area of margins 16 and 18 and tabs 20 and 22 and the tabs 20 and 22 may be bent upwardly through margins 16 and 18 and then over segment 12 to firmly fasten the two segments together against relative movement at the area of such joining. Other suitable means of joining segments 12 and 14 could be used as a substitute for the method herein disclosed.

Arc segment 12 is provided with a pair of flanges 24 and 26 at each end thereof. Flanges 24 and 26 are uniformly shaped and coextensive and extend outwardly from segment 12 at obtuse angles relative thereto such that they lie in spaced parallel planes. Flanges 24 and 26 are provided with a pair of generally circular axially aligned apertures 28.

A threaded bolt 30 is inserted through flanges 24 and 26 with a helical coil spring biasing member 32 between head 34 of bolt 30 and flange 24. A nut 36 is threadably engaged with the end of bolt 30 remote from head 34 on the side of flange 26 facing away from flange 24. It can now easily be seen that as the bolt 30 and the nut 36 are tightened arc segments 12 and 14 are drawn arcuately together into an ever tightening circle until resistence to their radially inwardly facing surfaces prevents further such movement. At that time additional tightening of bolt 30 and nut 36 will put spring member 32 under tension between flange 24 and head 34 to whatever amount is desired.

Arc segments 12 and 14 are further provided as viewed in cross-section with a centrally disposed complementary radially inwardly protruding head 38. The balance of segments 12 and 14 comprises two compression flanges 40 and 42 respectively on opposite sides of head 38 and at angle to the radially inwardly facing side of head 38 of slightly less than 180°.

It can now easily be seen that as arc segments 12 and 14 are drawn together in the manner previously described head 38 will depress into the outwardly facing surface of the pliable or deformable hose exerting a pressure seal in a radially inward direction against the pipe or flange inserted in the hose. At the same time pressure will be exerted in the deforming process longitudinally along the hose in both axial directions. Similarly the edges of flanges 40 and 42 remote from head 38 will exert the same type of pressures as head 38 creating two spaced parallel seals around the pipe or flange one on either side of and spaced and parallel to the seal formed by head 38.

The longer the hose remains in its deformed state the greater its tendency will be to assume permanently its deformed shape and therefore to cease exerting pressure back against head 38 and the edges of flanges 40 and 42 remote from head 38. Likewise deterioration of the hose from heat and pressure will deprive the hose of some of its resiliency and thereby reduce its pressure back. Such events would normally decrease the sealing engagement of the hose and pipe or flange but with the structure herein described if spring 32 is under substantial tension the spring will tighten the clamp gradually as the effects above reduce original clamp tension thereby insuring the maintenance of the triple seal described. Leakage even under pressure is thereby eliminated until the clamp is deliberately removed or the hose ruptures due to age, pressure or other reasons.

It can now be seen that the structure herein described accomplishes all of the purposes of the invention previously set forth herein and such structure will be covered in the scope of the appended claims.

I claim:

1. A clamp for sealing a telescoping engagement between a deformable cylindrical hose and a cylindrical metal member inserted in said hose including an arcuate member encircling said hose at the area of telescoping engagement, means on said arcuate member for drawing said arcuate member together arcuately to form at least a 360° circle and for placing said arcuate member under tension after it is drawn arcuately together, and means on said arcuate member to seal said hose and said cylindrical member around their area of telescoping engagement including a centrally disposed, radially inwardly facing, arcuate head and flanges extending outwardly from said head in opposite directions at an angle to the radially inwardly facing surface of said head of less than 180° creating a pair of spaced parallel sealing inducing edges on said arcuate members in spaced parallel relationship to each other and to said head on opposite sides of said head.

2. The invention as set forth in claim 1, wherein said arcuate member includes a pair of arcuate segments complementary in cross-sectional dimension and coupled together adjacent one arcuate extremity to each segment in radially flush engagement against relative movement between said segments at the area of coupling.

3. The invention as set forth in claim 2, wherein the means for drawing said arcuate member together arcuately and for placing said arcuate member under tension are disposed on one of said arc segments.

4. The invention as set forth in claim 3, wherein said means for drawing said arcuate member together arcuately and for placing said arcuate member under tension includes a pair of spaced parallel flanges, one located at each arcuate extremity of one of said arc segments, said flanges being generally co-extensive and each provided with a generally centrally disposed circular aperture, said apertures being axially aligned and being adapted to receive therethrough an elongated threaded bolt having a slotted head at one end, a biasing means on said bolt between said head and one of said flanges and a nut threadably engaged with said bolt at the end thereof remote from said head on the side of the remaining of said flanges facing in a direction opposite to the direction of said bolt head.

* * * * *